United States Patent
Latimer et al.

(10) Patent No.: US 8,556,280 B1
(45) Date of Patent: Oct. 15, 2013

(54) SHOULDER-MOUNTED HAND TRUCK

(76) Inventors: Ronald A. Latimer, Marseilles, IL (US);
Leslie B. Latimer, Seneca, IL (US);
Albert D. Latimer, Marseilles, IL (US)

( * ) Notice: Subject to any disclaimer, the term of this patent is extended or adjusted under 35 U.S.C. 154(b) by 192 days.

(21) Appl. No.: 13/109,629

(22) Filed: May 17, 2011

Related U.S. Application Data

(60) Provisional application No. 61/345,319, filed on May 17, 2010.

(51) Int. Cl.
*B62B 1/04* (2006.01)

(52) U.S. Cl.
USPC ............ 280/47.29; 280/47.28; 414/490

(58) Field of Classification Search
USPC ......... 280/47.131, 47.17, 47.18, 47.24, 47.27, 280/47.28, 47.29; 414/490, 444
See application file for complete search history.

(56) References Cited

U.S. PATENT DOCUMENTS

| | | | |
|---|---|---|---|
| 2,342,178 A | | 2/1944 | Chenette |
| 2,598,489 A | * | 5/1952 | Bayer et al. ............... 414/467 |
| 2,895,567 A | * | 7/1959 | Hall ........................... 187/224 |
| 3,907,138 A | * | 9/1975 | Rhodes ...................... 414/448 |
| 4,448,434 A | | 5/1984 | Anderson |
| 4,582,165 A | | 4/1986 | Latini |
| 5,120,072 A | | 6/1992 | Laramie |
| 5,564,720 A | * | 10/1996 | Stringer .................... 280/30 |
| 5,738,480 A | * | 4/1998 | Butzen ....................... 414/490 |
| D427,765 S | | 7/2000 | Porter |
| 6,357,063 B1 | | 3/2002 | Selby |
| 6,530,740 B2 | * | 3/2003 | Kim ........................... 414/490 |
| 6,942,228 B2 | * | 9/2005 | Bunce et al. ................ 280/30 |
| 7,021,508 B1 | | 4/2006 | Aston |

OTHER PUBLICATIONS

Pro Lift Shoulder Dolly, Heavy-Duty. http://www.yourhomeourproducts.com/store/ccp0-prodshow/TL-SD-HD.html. Accessed Sep. 11, 2009.

* cited by examiner

*Primary Examiner* — John Walters
(74) *Attorney, Agent, or Firm* — Montgomery Patent & Design; Robert C. Montgomery

(57) ABSTRACT

A hand truck comprising an elevating load platform and a carrying frame used to transport heavy and bulky loads on a back of a user. Automated lowering and rising of the platform is accomplished by a threaded rod that runs vertically along a rear spine of the hand truck frame. The rod is connected to an electric motor operated by a small rechargeable battery carried on board. A shoulder harness is provided directly below a handle assembly enabling the user to place the loaded hand truck on their shoulders. Activation of the raised platform elevates the load to the shoulder area where it can be carried more comfortably and safely.

13 Claims, 5 Drawing Sheets

SHOULDER-MOUNTED HAND TRUCK

RELATED APPLICATIONS

The present invention was first described in and claims the benefit of U.S. Provisional Application No. 61/345,319 filed May 17, 2010, the entire disclosure of which is incorporated herein by reference.

FIELD OF THE INVENTION

The present invention relates generally to a hand truck, and in particular, to a hand truck with a shoulder-mounted carrying means and motorized lifting mechanism.

BACKGROUND OF THE INVENTION

Hand trucks are one of the most commonly utilized pieces of equipment for manual transportation of small, heavy items over short distances. Such devices are commonly utilized for delivery and stocking operations, such as transporting boxes of products from a truck to a delivery point or for transporting quantities of merchandise from a storage area to a retail shelf for stocking.

One (1) common concern with hand trucks is that their narrow platform results in vertical stacking of objects during transport. When the objects are unloaded at the delivery point, they are removed from the top down. As the last remaining boxes or objects are removed from the hand truck, the user is forced to bend over nearly to the floor, which poses safety and health concerns.

Another common problem with hand trucks is that, while they are very efficient for moving objects across flat ground surfaces with minimal strain, it is very difficult to navigate even minor vertical obstructions such as stairways or even single steps in the entranceway of a building. This generally forces the user to either get help, lift the entire hand truck and load over the obstruction, or manually transport the objects beyond the point of the obstruction.

Various attempts have been made to provide mechanically or electrically assisted hand trucks adapted to help a user lift the laden hand truck during use. Examples of these attempts can be seen by reference to several U.S. patents. U.S. Pat. No. 4,057,119, issued in the name of Melson, describes a powered hand truck adapted to help a user climb stairs. U.S. Pat. No. 5,829,763, issued in the name of Jeavons, describes an attachable elevating unit for hand trucks which provides assisted lifting of the entire hand truck against a ground surface. U.S. Pat. No. 6,398,477, issued in the name of Fox, discloses an electric hand truck with motorized lift capabilities for raising or lowering objects from loading docks, trucks, or the like.

While these apparatuses fulfill their respective, particular objectives, each of these references suffer from one (1) or more of the aforementioned disadvantages. Many such apparatuses are very slow to operate. Also, many such apparatuses help to navigate the hand truck over stairs and the like but do not assist in unloading objects on the hand truck in an elevated manner. Furthermore, many such apparatuses are not adapted to navigate vertical obstructions. In addition, many such objects are slow to operate and unnecessarily complex when, for instance, the user desires to quickly navigate a single step while entering a building. Accordingly, there exists a need for a hand truck without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a hand truck with powered lifting assistance which can quickly and simply navigate vertical obstructions. Thus, the object of the present invention is to solve the aforementioned disadvantages and provide for this need.

To achieve the above objectives, it is an object of the present invention to provide assistance in transporting a load on a pair of wheels while angled towards a user, in a manner similar to a common hand truck.

Another object of the present invention is to enable the user to quickly navigate vertical obstructions in a ground surface by providing first and second shoulder braces that allow the user to securely brace the apparatus against their back. In this manner, the user can quickly manually lift the hand truck and load and navigate a step, stairway, or similar obstruction. Each shoulder brace includes a shoulder pad to cushion the user's shoulders during use and a strap to secure the shoulder brace to the user.

Yet still another object of the present invention is to provide digit openings within each shoulder brace allowing the user to grip and wheel the apparatus in a common manner when on a level ground surface.

Yet still another object of the present invention is to provide a pair of ergonomic handles located midway down the sides of the apparatus at arm's length and oriented forward. The ergonomic handles provide a secure and stabilizing grip for the user when transporting the apparatus using the shoulder braces.

Yet still another object of the present invention is to provide a motorized lifting mechanism allowing the user to raise or lower a retractable portion of the apparatus in an assisted manner. Vertical positioning of the load can be utilized to position the load for ease of loading or unloading as well as to provide a desired distribution of weight prior to carrying the apparatus on the user's shoulders.

Yet still another object of the present invention is to guide the retractable lower portion of the apparatus within a stationary upper portion with a pair of channel members in the retractable portion that engage a pair of tracks within the stationary portion.

Yet still another object of the present invention is to provide a motor that rotates a lead screw connected to the stationary portion. The lead screw engages a threaded nut attached to the retractable portion such that rotation of the lead screw motions the retractable portion including a platform for holding the load.

Yet still another object of the present invention is to provide an activation switch located on one of the ergonomic handles allowing the user to operate the motor while carrying the apparatus on their shoulders.

Yet still another object of the present invention is to provide an additional vertically adjustable platform removably attached above the stationary platform to provide additional support, storage, and bifurcation of the load.

Yet still another object of the present invention is to provide a method of utilizing the device that provides a unique means of acquiring the apparatus, positioning a load on the adjustable platform and stationary platform, resting each shoulder pad on the shoulder region of the user, depressing the activation switch to operate the motor, transporting the load to a desired location, lifting and moving loads up and down steps or around obstructions. Another alternately engaging the digit openings and transporting the apparatus to a desired location with the wheels, and, utilizing the apparatus in a conventional manner.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
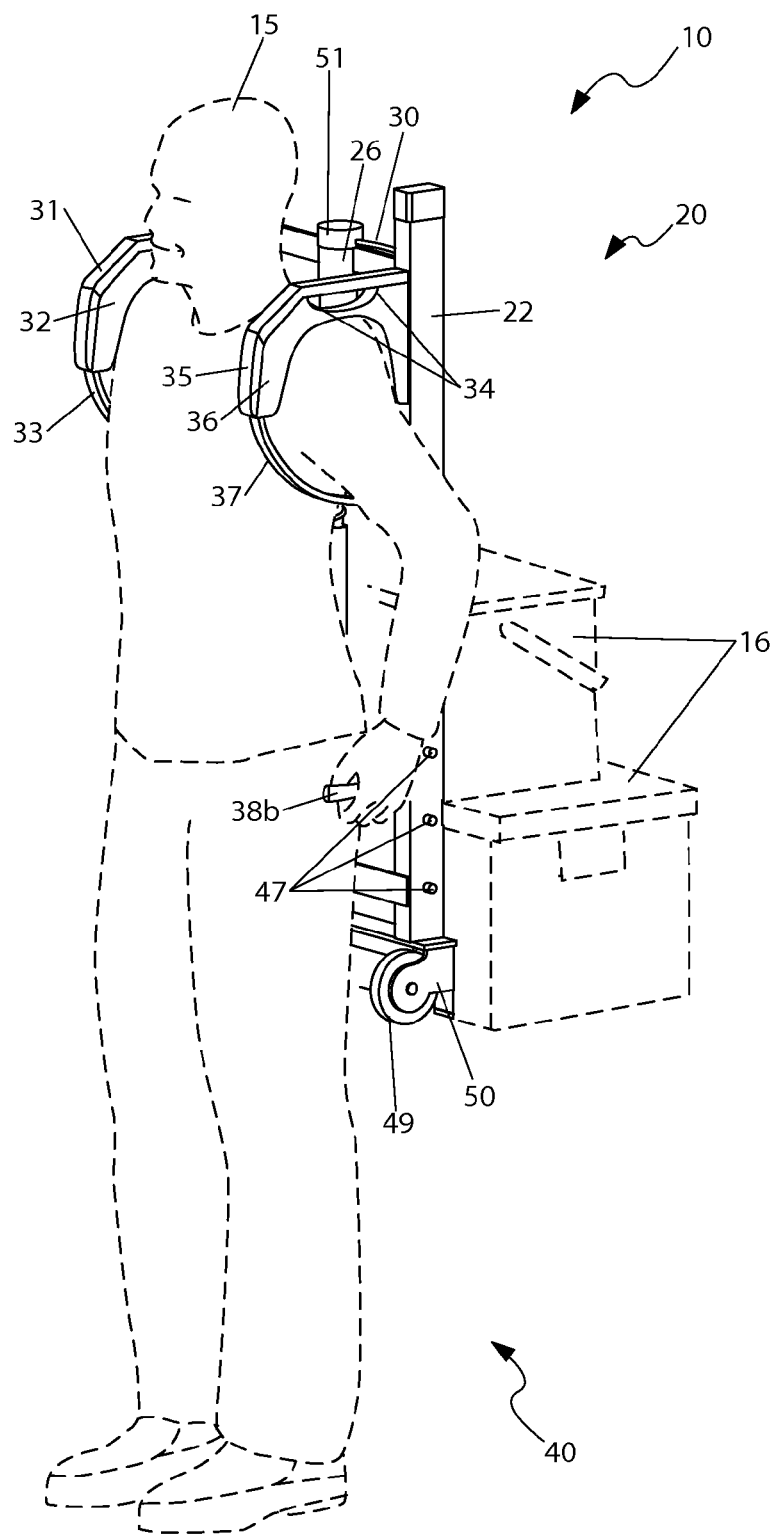
FIG. 1 is an environmental view of a shoulder-mounted hand truck 10, according to a preferred embodiment of the present invention.

DESCRIPTIVE KEY 10 shoulder-mounted hand truck
15 user
16 load
20 stationary portion
21 first track
22 second track
23 first brace
24 second brace
25 third brace
26 motor
27 lead screw
28 coupler
29 guard
30 electrical wire
31 first shoulder brace
32 first shoulder pad
33 first strap
34 digit opening
35 second shoulder brace
36 second shoulder pad
37 second strap
38a first handle
38b second handle
39 activation switch
40 retractable portion
41 first channel member
42 second channel member
43 nut
44 tube
45 adjustable platform
46 platform attachment
47 projection
48 stationary platform
49 wheel
50 wheel attachment
51 battery

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a shoulder-mounted hand truck (herein described as the "apparatus") 10, comprising a common hand truck frame including enhanced shoulder-mounting and automated features to enable a user 15 to transport the apparatus 10 upon their shoulder region. A load 16 is positioned onto the apparatus 10 in a conventional upright manner which may be electrically and mechanically lifted to distribute the weight of the load 16 evenly upon the user's 15 back. The apparatus 10 is also utilized in a conventional manner which enables the user 15 to transport the load 16 which is angled toward said user 15 for subsequent transfer to a desired location via a pair of wheels 49.

Referring now to FIG. 1, an environmental view of the apparatus 10, according to the preferred embodiment of the present invention, is disclosed. The apparatus 10 comprises a stationary portion 20 and a retractable portion 40. The stationary portion 20 is located on an upper portion of the apparatus 10 and the retractable portion 40 is adjustably attached below the stationary portion 20. Each portion 20, 40 is arranged in a vertical position with respect to an upright user 15. The stationary portion 20 comprises a first track 21, a second track 22, a motor 26, a lead screw 27, a first shoulder brace 31, and a second shoulder brace 35. The retractable portion 40 comprises a first channel member 41, a second channel member 42, a tube 44, an adjustable platform 45, and a stationary platform 48. The apparatus 10 is fabricated from materials such as, but not limited to: aluminum, wood, plastic, or the like.

Figure 2:
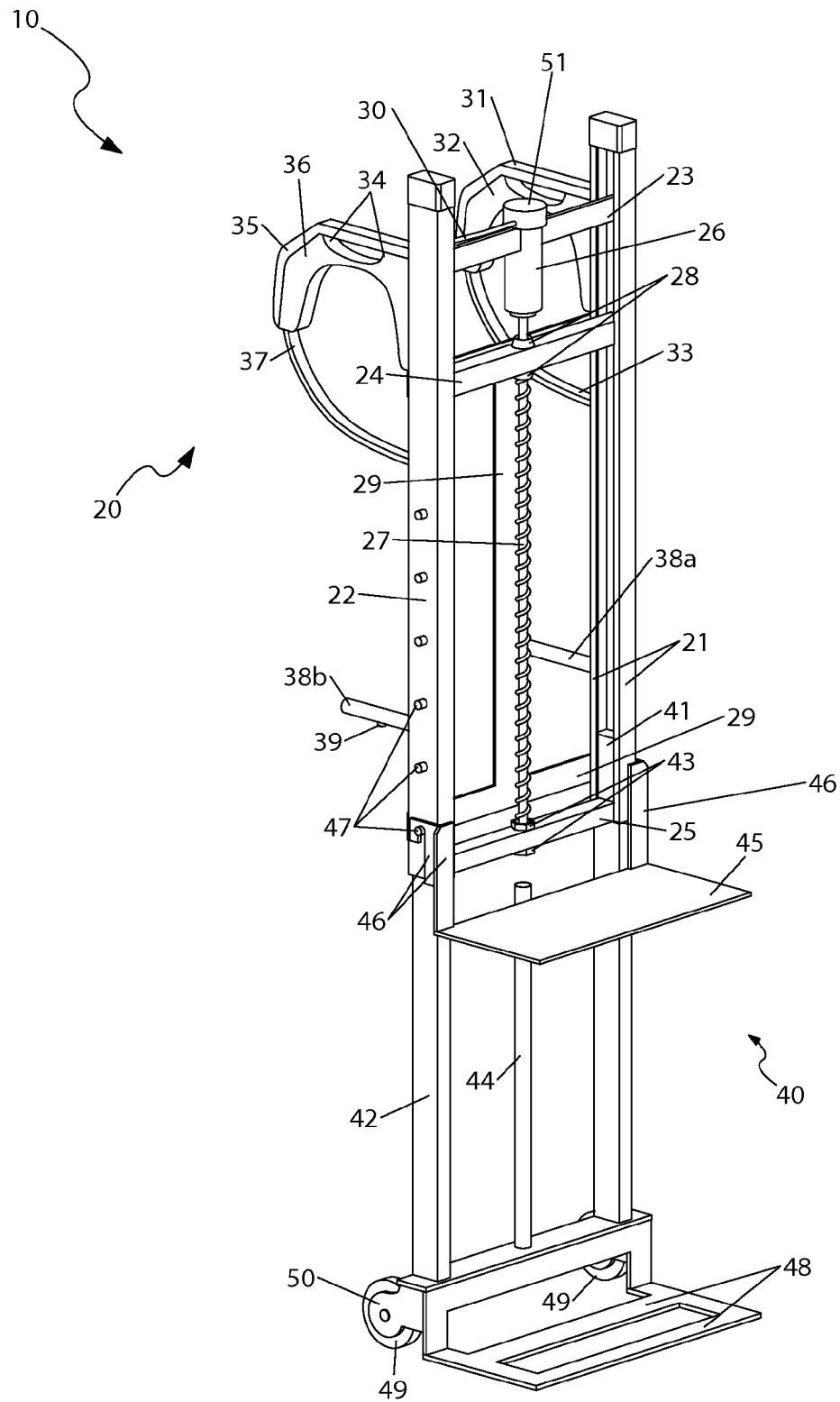
FIG. 2 is a side perspective view of the shoulder-mounted hand truck 10, according to a preferred embodiment of the present invention.
Figure 3:
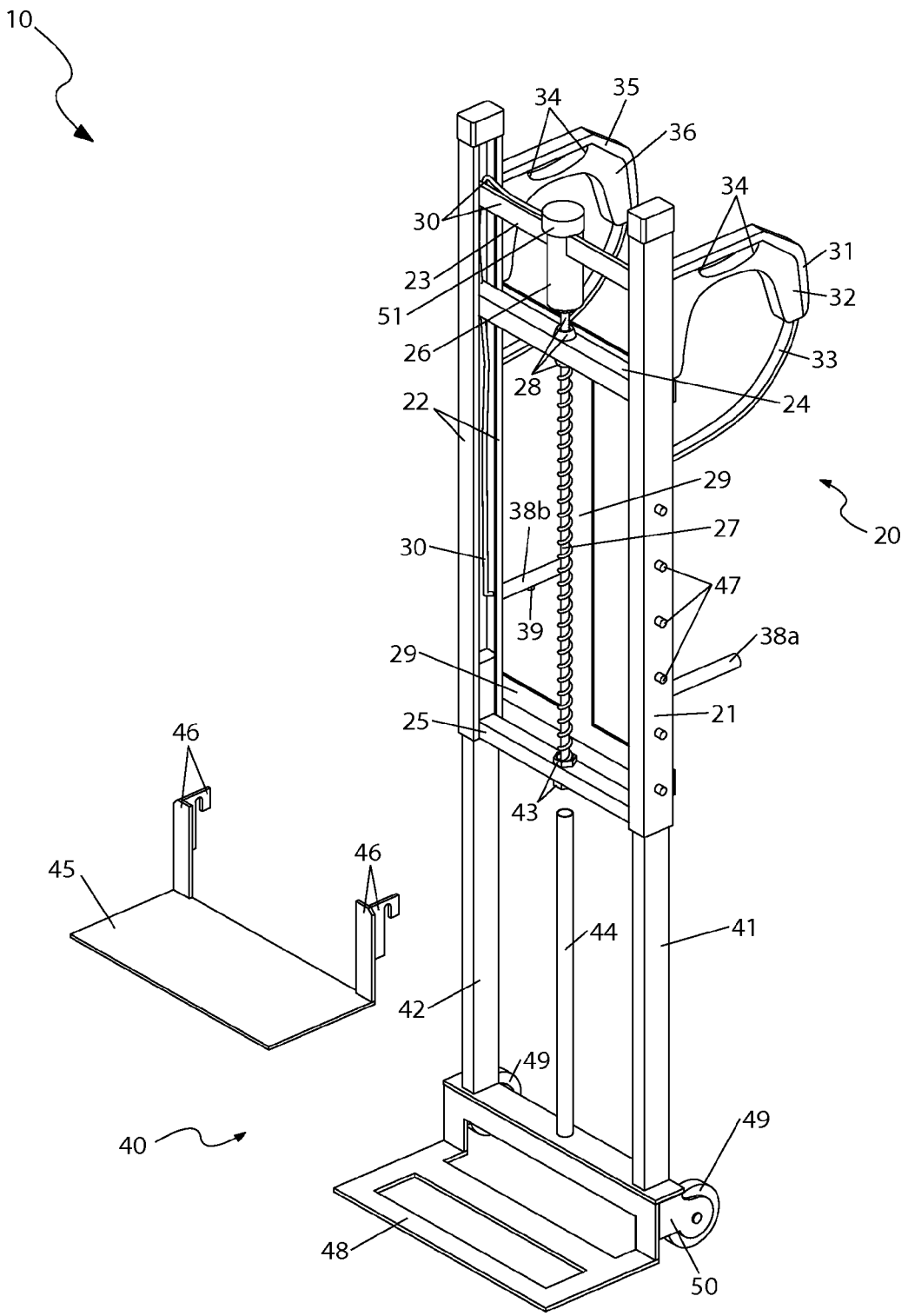
FIG. 3 is an opposing side perspective view of the shoulder-mounted hand truck 10, according to a preferred embodiment of the present invention.
Figure 4:
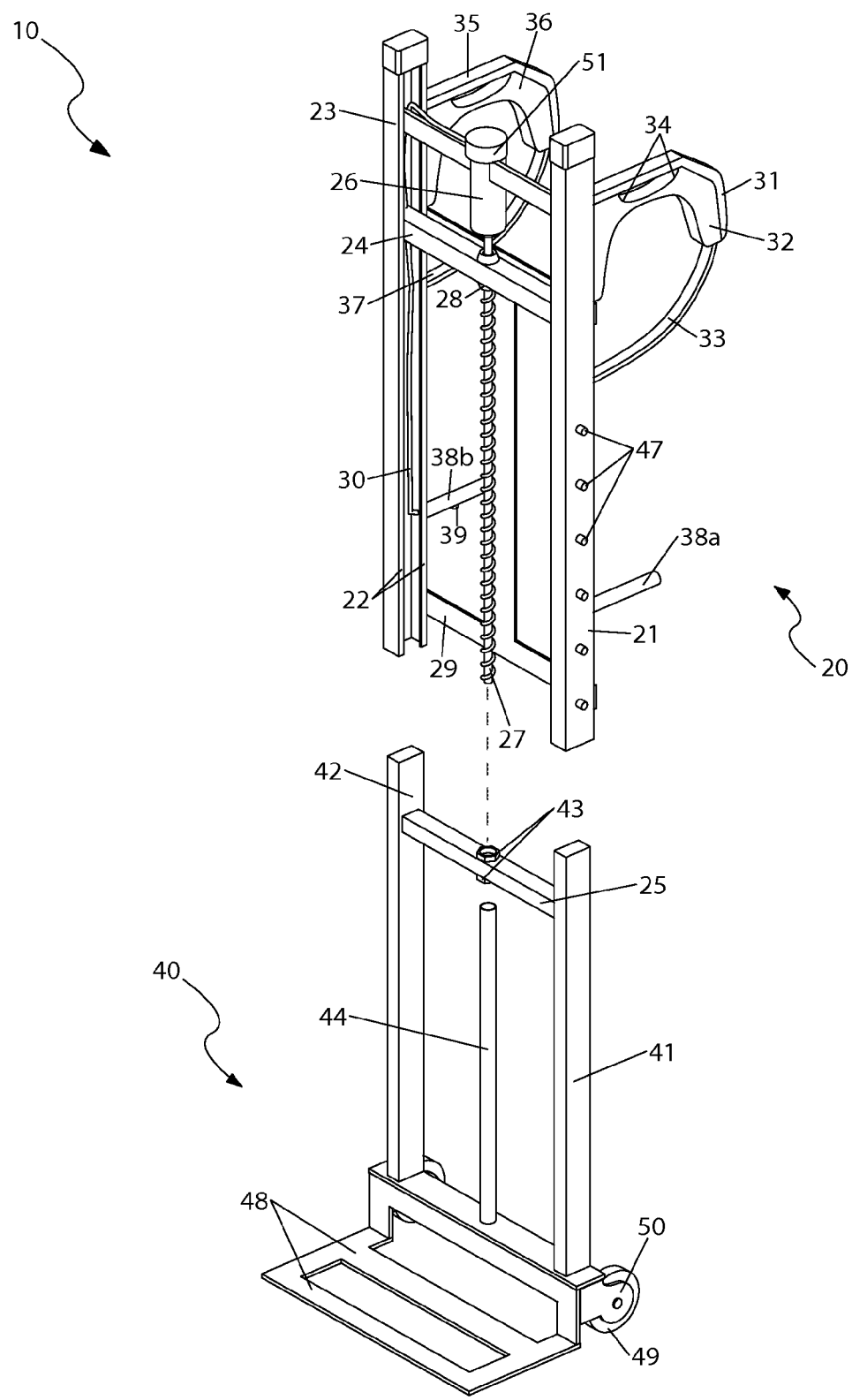
FIG. 4 is an exploded perspective view of the shoulder-mounted hand truck 10, according to a preferred embodiment of the present invention; and, FIG. 5 is an electrical block diagram of the shoulder-mounted hand truck 10, according to a preferred embodiment of the present invention.

Referring now to FIG. 2, a side perspective view of the apparatus 10, FIG. 3, an opposing side perspective view of the apparatus 10, and FIG. 4, an exploded perspective view of the apparatus 10, according to the preferred embodiment of the present invention, are disclosed. The stationary portion 20 comprises a first track 21 and a second track 22 in a parallel orientation. The tracks 21, 22 are "C"-shaped which enables a first channel member 41 and a second channel member 42 to travel within said tracks 21, 22, respectively (see herein below). The tracks 21, 22 are equally spaced and secured via a first brace 23 and a second brace 24 which are positioned in a horizontal orientation at an upper location of the stationary portion 20. The distance between the first brace 23 and the second brace 24 enables ample space for placement of a motor 26. The shaft of the motor 26 is positioned in a downward manner to enable a coupler 28 to interconnect the motor shaft to the lead screw 27. The coupler 28 is fixed to the second brace 24. The motor 26 preferably comprises a rechargeable DC battery 51 (also see FIG. 5), yet other devices may be utilized without limiting the scope of the apparatus 10. The lead screw 27 is a shaft comprising an exterior surface which is threaded. The lead screw 27 is located at in intermediation position between the second brace 24 and a third brace 25 and the tracks 21, 22. A "T"-shaped guard 29 is positioned in front of the lead screw 27 which provides protection to the user's 15 back while in use. The guard 29 is attached to the rear portion of the stationary portion 20 via means such as, but not limited to: welding, nuts and bolts, or the like.

The rear portion of the stationary portion 20 also comprises a means for the user 15 to handle the apparatus 10. An upper rear portion of the stationary portion 20 comprises a first shoulder brace 31 and a second shoulder brace 35. The first shoulder brace 31 is attached to the first track 21 and the second shoulder brace 35 is attached to the second track 22, each oriented forwardly. Each shoulder brace 31, 35 is attached perpendicular to its respective track 21, 22 via means such as, but not limited to: welding, nuts and bolts, or the like. The first shoulder brace 31 comprises a first shoulder pad 32 and the second shoulder brace 35 comprises a second shoulder pad 36, each of which provide a comforting cushioning means to the user 15 during use. The shoulder pads 32, 36 are fabricated from a foam rubber material, yet other materials may be utilized without limiting the scope of the apparatus 10. Each shoulder pad 32, 36 comprises a digit opening 34 which provides a gripping means to the apparatus 10 which enables the apparatus 10 to be utilized in a conventional transporting manner which requires the user 15 to push or pull the apparatus 10 along a level surface via a pair of wheels 49 (see herein below). The first shoulder brace 31 also comprises a first strap 33 and the second shoulder brace 35 also comprises a second strap 37, each of which provide a securing means to the user 15. The straps 33, 37 are fabricated from a padded fabric and are also attached to a respective track 21, 22 via common fastening means.

The stationary portion 20 also comprises a pair of ergonomic handles 38a, 38b which provide the user 15 with a means to stabilize the apparatus 10 during use. The handles 38a, 38b are positioned on a rear lower surface of the stationary portion 20 at arms length and oriented forwardly. The second handle 38b preferably comprises an activation switch 39 which activates the motor 26 to motion in a forward or reverse direction. The second handle 38b is depicted herein as comprising the activation switch 39 for illustration purposes only it is known that other locations may be utilized without limiting the scope of the apparatus 10. The activation switch 39 is comprised of a conventional dual positional pushbutton, yet other electrical switches may be utilized without limiting the scope of the apparatus 10. Each handle 38a, 38b is attached to the rear surface of the tracks 21, 22 via means such as, but not limited to: welding, nuts and bolts, or the like.

The retractable portion 40 comprises a first channel member 41 and a second channel member 42 which engage the first track 21 and second track 22, respectively to enable said retractable portion 40 to be retracted or extended. Each channel member 41, 42 comprises a rectangular-shape which enables each to slidably engage the respective tracks 21, 22. Secured perpendicularly to an inner portion of the channels 41, 42 is the third brace 25 which also provides a guidance means to the lead screw 27 via an internally threaded nut 43. The threads upon the lead screw 27 engages the threads upon the nut 43 to pull or push the retractable portion upwardly or downwardly and concurrently enabling the tracks 21, 22 to engage the respective channels 41, 42. The nut 43 is fixed to an upper surface of a third brace 25 and is utilized to direct and guard the lead screw 27 through said nut 43 and into a tube 44.

The lead screw 27 descends into the tube 44 when the apparatus 10 is retracted. The tube 44 is slightly larger in diameter than the lead screw 27 which enables the tube 44 to accept the lead screw 27. The tube 44 is attached to a lower horizontal member of the retractable portion 40 via common attachment means.

A front lower portion of the retractable portion 40 also comprises a stationary platform 48 which provides a level surface to position a load 16. The stationary platform is positioned perpendicular to the channel members 41, 42. A rear lower portion of the retractable portion 40 comprises a pair of wheels 49 which provide a conventional transporting means to the apparatus 10. The wheels 49 are attached to a wheel attachment 50 which enables said wheels 49 to rotate and transport the apparatus 10 to a desired location as determined by the user 15 directing said apparatus 10 via grasping the digit openings 34.

The apparatus 10 also comprises an adjustable platform 45 providing a height adjustable level surface to position an additional load 16. The adjustable platform 46 comprises an "L"-shape which enables a vertical platform attachment 46 to attach to a desired projection 47. A plurality of projections 47 is located in series along the side surfaces of the tracks 21, 22. The projections 47 are comprised of bolts, yet other means may be utilized without limiting the scope of the apparatus 10. Each platform attachment 46 slidably engages and locks onto a desired projection 47 which stabilizes the adjustable platform 45 against the tracks 21, 22.

Figure 5:
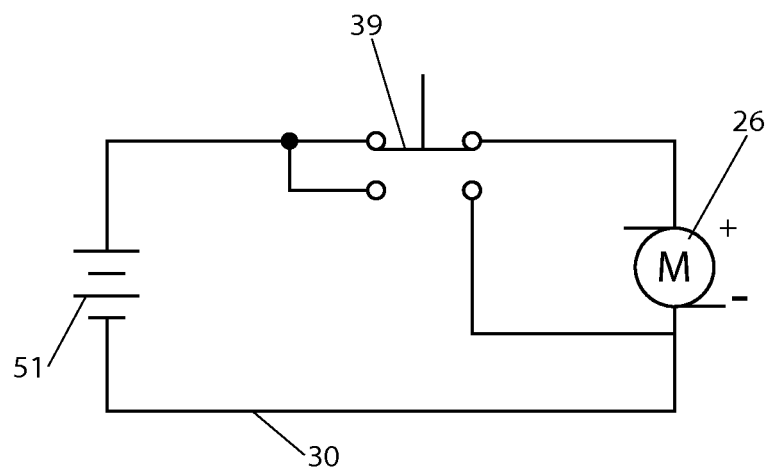

Referring now to FIG. 5, an electrical block diagram depicting the major electrical components of the apparatus 10, according to the preferred embodiment of the present invention, is disclosed. Current is supplied to the activation switch 39 and the motor 26 via the battery 51. With the battery 51 fully charged, the activation switch 39 may be depressed to a desired orientation to activate the motor 26 in a clockwise or counterclockwise direction which concurrently rotates the lead screw 27 to move the apparatus 10 downwardly or upwardly, respectively. The battery 51 is preferably located within the motor 26 and is interconnected to the activation switch 39 and the motor 26 via appropriately gauged electrical wiring 30.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of utilizing the apparatus 10 may be achieved by performing the following steps: acquiring the apparatus 10; positioning the apparatus 10 onto a level surface with each wheel 49 superjacently engaging the level surface; positioning the adjustable platform 45 to a desired height via engaging each platform attachment 46 with a desired projection 47; positioning a desired load 16 onto the adjustable platform 45 and stationary platform 48; arranging the user's 15 arms through each strap 33, 37 and resting each shoulder pad 32, 36 upon the shoulder region of the user 15; depressing the activation switch 39 on the first handle 38a to engage the motor 26 which rotates the lead screw 27 and concurrently ascends the retractable portion 40 into the stationary portion 20; releasing the activation switch 39 when a desired height is reached; transporting the load 16 to a desired location; lifting upwardly upon the handles 38a, 38b to support the load 16 as necessary; depressing the activation switch 39 to descend the retractable portion 40; removing the apparatus 10 from the user's 15 shoulder region; unloading the apparatus 10 in a conventional manner; and, lifting and moving loads 16 up and down steps, around obstructions, and load them in a manner that reduces back strain.

Another method of utilizing the apparatus 10 may be achieved in a conventional manner by performing the following steps: acquiring the apparatus 10; positioning the apparatus 10 onto a level surface with each wheel 49 superjacent to the level surface; positioning the adjustable platform 45 to a desired height via engaging each platform attachment 46 with a desired projection 47; positioning a desired load 16 onto the adjustable platform 45 and stationary platform 48; enabling the user 15 to engage the digit opening 34 with their hands; positioning the apparatus 10 at an angle toward the user 15 and supporting the load 16 with the user's 15 arms; transporting the apparatus 10 to a desired location via the wheels 49; positioning the apparatus 10 to an original vertical position; and, utilizing the apparatus 10 in a conventional manner.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A shoulder-mounted hand truck comprising:
    a stationary portion, comprising:
        first and second tracks in a parallel orientation to each other;
        a lead screw attached to said motor and positioned between said first and second tracks respectively;
        first and second shoulder braces attached to said first and second tracks respectively; and,
        a T-shaped guard attached to said first and second tracks;
    a retractable portion attached to said stationary portion;
    a motor;
    a stationary platform attached to said stationary portion; and,
    first and second shoulder braces attached to said stationary portion respectively;
    wherein said stationary portion comprises:
        first and second tracks in a parallel orientation to each other;
        a lead screw attached to said motor and positioned between said first and second tracks respectively;
        first and second shoulder braces attached to said first and second tracks respectively; and,
        a T-shaped guard attached to said first and second tracks;
    wherein activation of said motor causes said retractable portion to linearly slide towards and away from said stationary portion while said first and second shoulder braces are adapted to be positioned on an upright user's shoulders; and,
    wherein each of said stationary and retractable portions is adapted to be arranged in a vertical position with respect to the upright user.

2. The shoulder-mounted hand truck of claim 1, wherein said retractable portion comprises:
    first and second channel members slidably interfitted within said first and second tracks respectively;
    a tube receiving said lead screw therein; and,
    an adjustable platform removably attached to said first and second tracks.

3. The shoulder-mounted hand truck of claim 2, wherein said motor comprises:
    a coupler interconnecting said motor to said lead screw, said coupler being affixed to said second brace.

4. The shoulder-mounted hand truck of claim 2, wherein said retractable portion comprises:
    a third brace secured perpendicularly to an inner portion of said channels such that said lead screw is guided through said third brace; and,
    a nut threadably engaged with said lead screw and thereby pulling and pushing said first and second channel members upwardly and downwardly along said first and second tracks respectively;
    wherein said lead screw descends into said tube when said retractable portion is retracted upward relative to said stationary portion.

5. The shoulder-mounted hand truck of claim 1, wherein said stationary portion further comprises:
    a pair of handles positioned on a rear lower surface of said stationary portion; and,
    an activation switch which activates said motor.

6. The shoulder-mounted hand truck of claim 1, further comprising: a plurality of wheels attached to a rear lower portion of said retractable portion.

7. A shoulder-mounted hand truck comprising:
    a stationary portion;
    a retractable portion adjustably attached to said stationary portion;
    a motor operably engaged with said retractable portion;
    a stationary platform attached to said stationary portion; and,
    first and second shoulder braces attached to said stationary portion respectively;
    wherein said stationary portion comprises:
        first and second tracks in a parallel orientation to each other;
        a lead screw attached to said motor and positioned between said first and second tracks respectively;
        first and second shoulder braces attached to said first and second tracks respectively; and,
        a T-shaped guard attached to said first and second tracks;
    wherein activation of said motor causes said retractable portion to linearly slide towards and away from said stationary portion while said first and second shoulder braces are adapted to be positioned on an upright user's shoulders; and,
    wherein each of said stationary and retractable portions is adapted to be arranged in a vertical position with respect to the upright user.

8. The shoulder-mounted hand truck of claim 7, wherein said retractable portion comprises:
    first and second channel members slidably interfitted within said first and second tracks respectively;
    a tube receiving said lead screw therein; and,
    an adjustable platform removably attached to said first and second tracks.

9. The shoulder-mounted hand truck of claim 8, wherein said motor comprises:
   a coupler interconnecting said motor to said lead screw, said coupler being affixed to said second brace.

10. The shoulder-mounted hand truck of claim 8, wherein said retractable portion comprises:
   a third brace secured perpendicularly to an inner portion of said channels such that said lead screw is guided through said third brace; and,
   a nut threadably engaged with said lead screw and thereby pulling and pushing said first and second channel members upwardly and downwardly along said first and second tracks respectively;
   wherein said lead screw descends into said tube when said retractable portion is retracted upward relative to said stationary portion.

11. The shoulder-mounted hand truck of claim 7, wherein said stationary portion further comprises:
   a pair of handles positioned on a rear lower surface of said stationary portion; and,
   an activation switch which activates said motor.

12. The shoulder-mounted hand truck of claim 7, further comprising: a plurality of wheels attached to a rear lower portion of said retractable portion.

13. A method of utilizing a shoulder-mounted hand truck, said method comprising the steps of:

providing a stationary portion comprising first and second tracks in a parallel orientation to each other, a lead screw positioned between said first and second tracks respectively, first and second shoulder braces attached to said first and second tracks respectively and, a T-shaped guard attached to said first and second tracks;

providing and adjustably attaching a retractable portion to said stationary portion;

providing and attaching a motor to said lead screw of said stationary portion;

operably engaging said motor with said retractable portion;

providing and attaching a stationary platform to said stationary portion;

providing and attaching first and second shoulder braces to said stationary portion respectively;

positioning an object on said stationary platform;

arranging each of said stationary and retractable portions in a vertical position with respect to an upright user by positioning said first and second shoulder braces on the upright user's shoulders; and, activating said motor and thereby causing said retractable portion to linearly slide towards and away from said stationary portion.

* * * * *